(12) United States Patent
Konate et al.

(10) Patent No.: US 12,492,526 B2
(45) Date of Patent: Dec. 9, 2025

(54) SYSTEM FOR TEMPORARILY HOLDING, DURING PILING OPERATIONS, A FOUNDATION PILE INTENDED TO RECEIVE THE MAST OF AN OFF-SHORE WIND TURBINE

(71) Applicant: REEL, Saint-Cyr-Au-Mont-D'or (FR)

(72) Inventors: Karamoko Konate, Saint-Rogatien (FR); Nicolas Bourgois, Champagne Au Mont D'or (FR)

(73) Assignee: REEL, Saint-Cyr-Au-Mont-d'Or (FR)

( * ) Notice: Subject to any disclaimer, the term of this patent is extended or adjusted under 35 U.S.C. 154(b) by 654 days.

(21) Appl. No.: 17/903,566

(22) Filed: Sep. 6, 2022

(65) Prior Publication Data

US 2023/0073785 A1 Mar. 9, 2023

(30) Foreign Application Priority Data

Sep. 6, 2021 (FR) .................................... 2109300

(51) Int. Cl.
| | |
|---|---|
| *E02D 7/00* | (2006.01) |
| *B63B 35/03* | (2006.01) |
| *B63B 35/44* | (2006.01) |
| *E02D 13/00* | (2006.01) |
| *F03D 13/25* | (2016.01) |

(52) U.S. Cl.
CPC ................ *E02D 7/00* (2013.01); *B63B 35/03* (2013.01); *B63B 35/44* (2013.01); *E02D 13/005* (2013.01); *F03D 13/25* (2016.05); *B63B 2035/446* (2013.01)

(58) Field of Classification Search
CPC ......... E02D 7/00; E02D 13/005; F03D 13/25; B63B 35/03; B63B 35/44; B63B 2035/446
See application file for complete search history.

(56) References Cited

U.S. PATENT DOCUMENTS

| | | | | |
|---|---|---|---|---|
| 5,492,436 | A | * | 2/1996 | Suksumake ............. E02B 17/00 |
| | | | | 301/5.23 |
| 2017/0275845 | A1 | | 9/2017 | Belder |
| 2020/0347960 | A1 | | 11/2020 | Roodenburg et al. |

FOREIGN PATENT DOCUMENTS

| | | |
|---|---|---|
| EP | 4208607 A1 | 7/2023 |
| WO | 2018117846 A1 | 6/2018 |
| WO | 2019125172 A2 | 6/2019 |
| WO | 2019172752 A2 | 9/2019 |
| WO | 2021/140217 | 7/2021 |
| WO | 2021/148479 | 7/2021 |

(Continued)

OTHER PUBLICATIONS

Search Report for FR Application No. 2109300 dated Apr. 25, 2022, 1 page.

*Primary Examiner* — Kyle Armstrong
(74) *Attorney, Agent, or Firm* — NIXON & VANDERHYE

(57) ABSTRACT

Disclosed is a system for the temporary holding, during pile driving operations, of a foundation pile intended to receive the mast of an offshore wind turbine. The temporary holding system includes a sleeve intended to receive a section of the foundation pile and a support frame intended to be secured to a floating device. The support frame includes a slide and an actuator, arranged to generate displacements of the sleeve according to the two translational degrees of freedom. The slide includes at least one rolling element including a cylindrical roller.

17 Claims, 9 Drawing Sheets

(56) References Cited

FOREIGN PATENT DOCUMENTS

| | | | |
|---|---|---|---|
| WO | 2022129246 | A1 | 6/2022 |
| WO | 2022200376 | A1 | 9/2022 |

* cited by examiner

SYSTEM FOR TEMPORARILY HOLDING, DURING PILING OPERATIONS, A FOUNDATION PILE INTENDED TO RECEIVE THE MAST OF AN OFF-SHORE WIND TURBINE

CROSS-REFERENCE TO RELATED APPLICATIONS

This application claims priority to FR Patent Application No. 2109300 filed Sep. 6, 2021, the entire contents of which are hereby incorporated by reference.

BACKGROUND OF THE INVENTION

Field of the Invention

The present invention relates to the technical field of equipment for the installation of offshore wind turbines and particularly of foundation piles.

It relates in particular to systems for the temporary holding, during pile driving operations, of a foundation pile intended to receive the mast of an off-shore wind turbine.

Description of the Related Art

Wind turbines are devices that convert the kinetic energy of the wind into electrical energy.

They consist of a mast (or tower) carrying a nacelle in which a rotor carrying blades is intended to turn. Within the nacelle, a generator transforms the kinetic energy of the rotor into electrical energy.

As an indication, the 8 MW wind turbines have a mast which can reach 140 meters in height, with a rotor of 164 meters in diameter. There are even plans for large wind turbines whose power would be between 10 and 15 MW, with the corollary of even larger dimensions.

A precise location of the foundation of these wind turbines is a major point, all the more so in the case of offshore wind turbines.

These foundations take up all the loads associated with the weight of the equipment (wind turbines) and the forces applied to them (wind, current, etc.).

Some foundations are in the form of a foundation pile, also known as a "monopile".

The anchoring in the ground of such a foundation pile is then advantageously obtained by pile driving operations.

For this, the foundation pile is positioned above its anchor point and then driven into the seabed using driving equipment (e.g. a hydraulic hammer) to the appropriate depth.

The implementation of these pile driving operations can be difficult. Indeed, the entity of foundation pile and driving equipment has to be kept vertical to the anchor point throughout the driving.

For this purpose, the laying machine (also named pile driver) is advantageously equipped with a dynamic positioning means or "DP" (computer-controlled system which allows a vessel to maintain its position by using its own means of propulsion).

However, this dynamic positioning may be insufficient to compensate for the relative movement of the vessel with respect to the desired laying position and with respect to the foundation pile being driven.

The laying of a wind farm therefore requires an effective solution to compensate for the relative movements of the laying machine and to optimize the temporary maintenance of the foundation piles in a precise position, throughout the pile driving operations.

SUMMARY OF THE INVENTION

In order to remedy the aforementioned drawback of the state of the art, the present invention proposes a system for temporarily holding, during pile driving operations, a foundation pile intended to receive the mast of a wind turbine off-shore.

The temporary holding system, also known as the "pile gripper", includes:
- a sleeve delimiting a through conduit, intended to receive a section of said foundation pile and defining a longitudinal axis, and
- a support frame which carries said sleeve and which comprises a base intended to be secured to a floating device.

The support frame comprises:
- slide means, defining two translational degrees of freedom between said sleeve and said base, said translational degrees of freedom extending in two parallel planes, being perpendicular to each other, and being perpendicular to said longitudinal axis of said sleeve, and
- actuating means, intended to generate displacements of said sleeve relative to said base according to said two translational degrees of freedom.

The slide means comprise two superimposed slide modules which each define one of said translational degrees of freedom.

Each one of the slide modules comprises:
- at least one rail comprising at least one raceway which is oriented parallel to said associated translational degree of freedom, and
- at least one rolling element intended to circulate along said at least one raceway.

And said at least one rolling element consists of a cylindrical roller.

The technical solution according to the invention confers movements on the sleeve according to two translational degrees of freedom (advantageously X-Y).

It further allows:
- a high rigidity to ensure high precision at all stages of the foundation pile laying process,
- a reduced use of cascading movements to optimize precision,
- a reduction in cycle times by precise positioning of the foundation piles,
- to optimize the size of the floating device,
- to target intrinsically safe solutions,
- a low energy consumption by reducing friction thanks to cylindrical rollers.

In addition, the implementation of cylindrical rollers allows high speed movements according to the two translational degrees of freedom.

Other non-limiting and advantageous characteristics of the product in accordance with the invention, taken individually or according to all technically possible combinations, are the following:
- the cylindrical roller comprises a support block equipped with cylindrical rollers which are connected by links to form at least one chain of cylindrical rollers; preferably, the chain of cylindrical rollers forms a chain of cylindrical rollers which are recirculating within said support block, which chain of recirculating cylindrical rollers comprises an active strand, cooperating with a raceway, and a returning inactive strand; preferably, a cylindrical roller comprises at least two chains of cylindrical rollers, juxtaposed laterally, cooperating with the same raceway;

said at least one rail comprises at least two raceways, namely at least one upper raceway, cooperating with an overlying cylindrical roller, at least one lower raceway, cooperating with an underlying cylindrical roller, and optionally at least one lateral raceway, cooperating with a lateral cylindrical roller, preferably an inner lateral raceway and/or an outer lateral raceway;

a lower first slide module, advantageously defining a lateral left/right translational degree of freedom, comprises at least one rail forming a base, and at least one rolling element secured with at least one rail of an upper second slide module; said upper second slide module, advantageously defining a forward/backward translational degree of freedom, comprises at least one rail secured to said at least one rolling element of the first slide module, and at least one rolling element equipping an interface carrying said sleeve cantilever;

the sleeve comprises at least two portions which are rotatable relative to each other, around an axis of rotation parallel to the longitudinal axis, to define two configurations: an open configuration, defining a radial passage allowing the passage of a foundation pile, and a closed configuration, delimiting the through conduit;

the sleeve comprises support segments, intended to bear on said section of foundation pile, which support segments are distributed over the circumference of said longitudinal axis and each comprise a support head; said bearing head advantageously comprises first rollers oriented perpendicular to the longitudinal axis, advantageously free in rotation, to maintain contact during relative movement in translation of the foundation pile with respect to the sleeve, and optionally comprises second rollers oriented parallel to the longitudinal axis, advantageously motorized, to control a relative movement in rotation between the foundation pile and said sleeve; preferably, the first rollers and/or the second rollers cooperate with actuating means between a retracted position/an extended position; also preferably, a bearing segment comprises means for actuating its bearing head in translation, along a radial axis of translation with respect to the longitudinal axis of the sleeve, and/or means for actuating its bearing head in rotation, along an arcuate trajectory whose center corresponds to the longitudinal axis of the sleeve;

the holding system comprises means for actuating the height of said sleeve relative to said base, according to a translational degree of freedom parallel to the longitudinal axis of said sleeve;

the sleeve is equipped with pile driving noise reduction means, for example an underwater sound barrier in the form of a bubble curtain, which sleeve and pile driving noise reduction means cooperate by actuating in relative rotation, for example a couple of rails and motorized trolleys;

the actuating means consist of electric motors, which electric motors are preferably associated with electrical energy storage means so as to store the electrical energy and so as to restore the electrical energy in an actuating phase, said electrical energy being generated by the electric power source of the equipped floating craft and/or by said electric motors in a braking phase;

said temporary holding system comprises means for collecting the relative position between said sleeve and said floating device; and said actuating means are associated with piloting means suitable for piloting said actuating means taking account of said relative position between said sleeve and said floating device in order to pilot said sleeve according to said two translational degrees of freedom, preferably to keep a geolocation, even a verticality.

The present invention also relates to a floating device, comprising:

a temporary holding system according to the invention, and a system for driving said foundation pile held in said temporary holding system.

Of course, the different characteristics, variants and embodiments of the invention can be associated with each other in various combinations as long as they are not incompatible or exclusive of each other.

BRIEF DESCRIPTION OF THE DRAWINGS

Further, various other characteristics of the invention emerge from the appended description made with reference to the drawings which illustrate non-limiting forms of embodiment of the invention and where.

DESCRIPTION OF THE PREFERRED EMBODIMENTS

Figure 1:
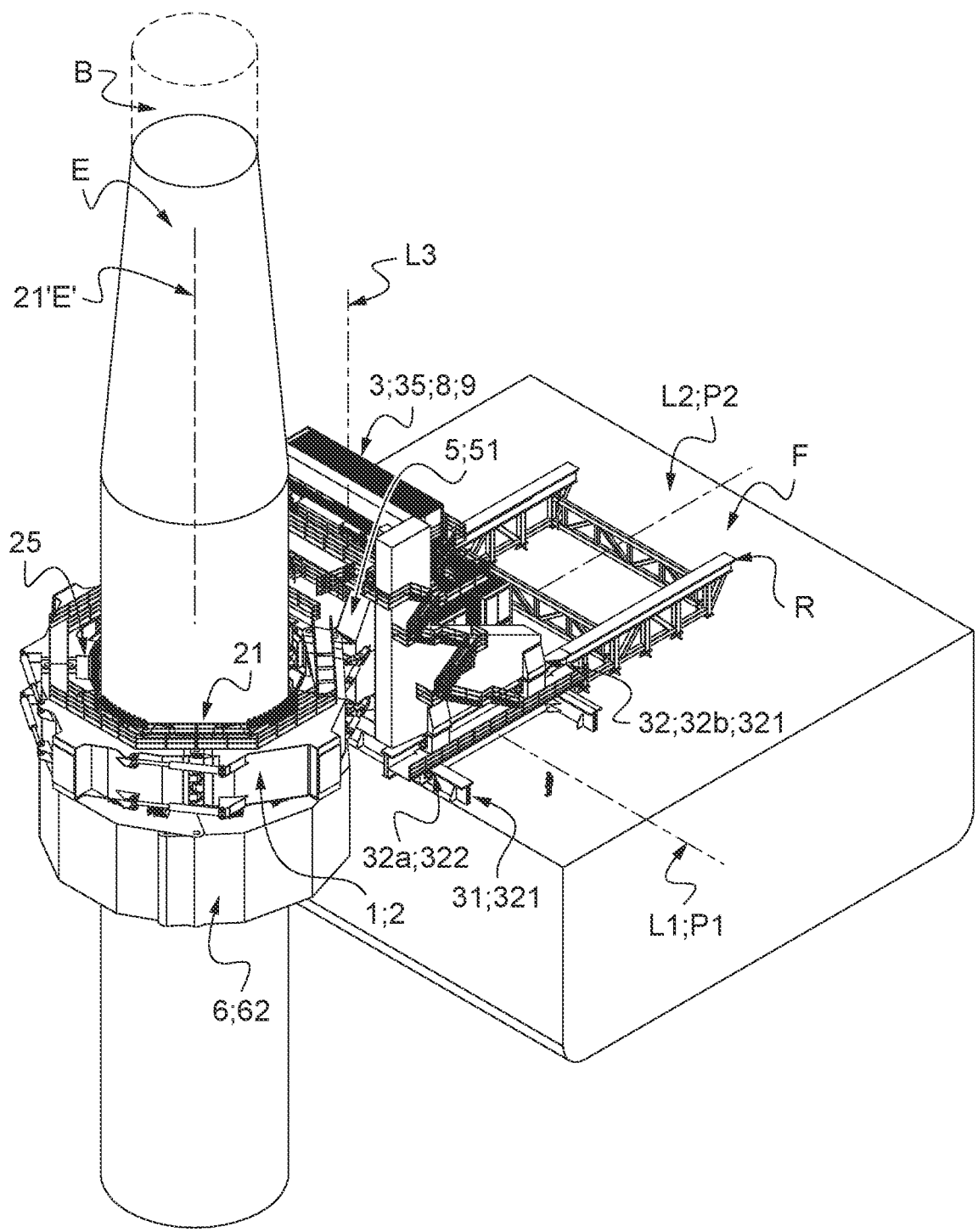
FIG. 1 is a general and perspective view of a system for the temporary holding, during pile driving operations, of a foundation pile intended to receive the mast of an off-shore wind turbine.
Figure 2:
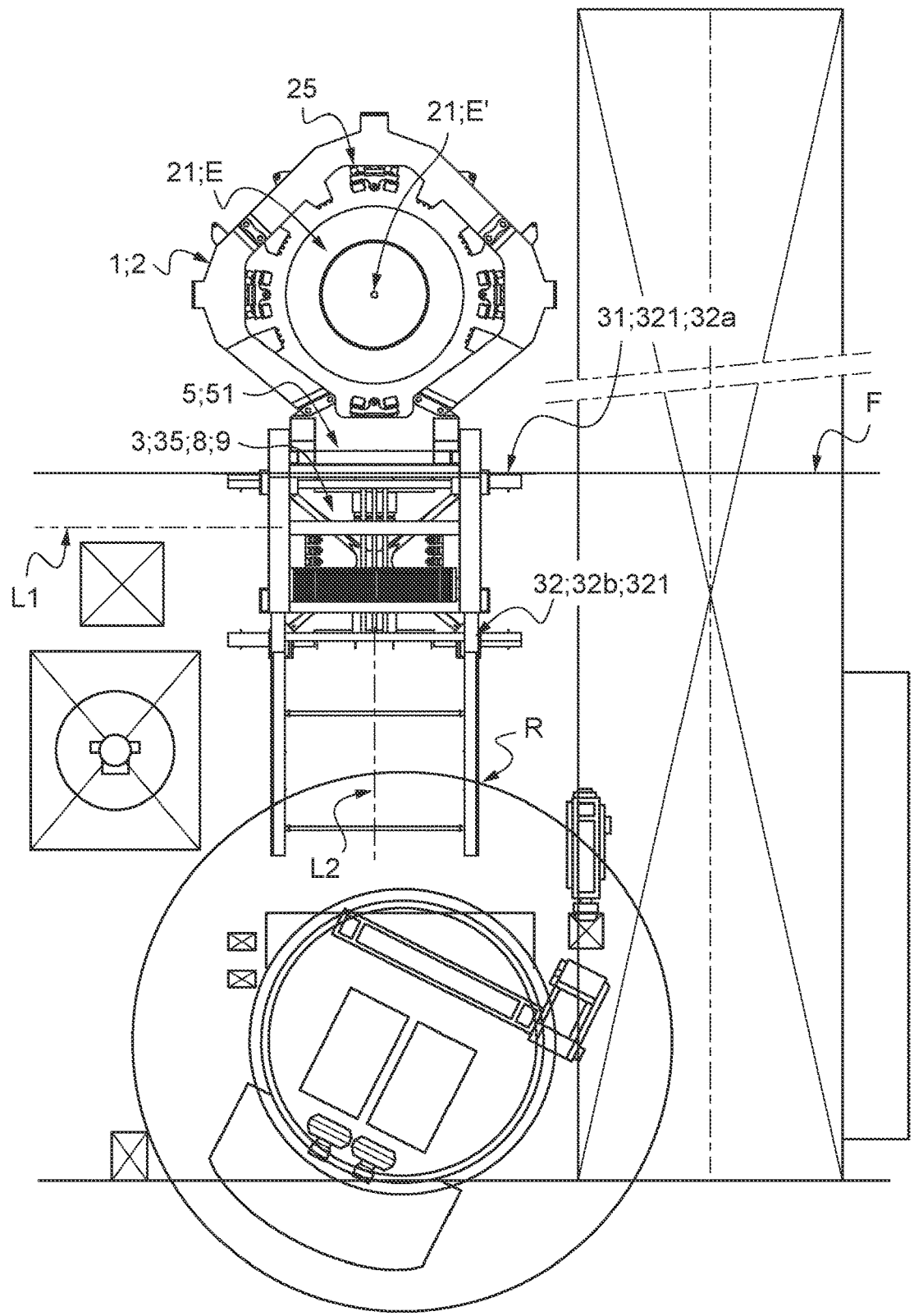
FIG. 2 is a general view from above of the temporary holding system according to FIG. 1, in which the sleeve is in the closed configuration around a foundation pile.

It should be noted that, in these figures, the structural and/or functional elements common to the different variants may have the same references.

The temporary holding system 1, described below in relation to the figures, consists of a system for temporarily holding a foundation pile E intended to receive the mast of an off-shore wind turbine (not shown).

In general, a wind turbine advantageously comprises three main parts:
- a mast,
- a nacelle positioned at the top of the mast, and
- a rotor composed of three blades inserted on a hub.

An off-shore wind turbine, or "sea wind turbine", is intended to be installed on a foundation that is anchored to the seabed.

In such an off-shore wind turbine, the electrical energy is advantageously transmitted to the foot of the tower where it is adapted by a converter and a transformer, so as to be exported to a substation at sea via inter-wind turbine cables.

The mast of the offshore wind turbine is attached here to a foundation pile E, also called "monopile" or "pile", intended to be implanted in the seabed by pile driving operations.

The mast is generally connected to this foundation pile E via a joint surmounted by a transition piece.

The temporary holding system 1 is in particular suitable for holding this foundation pile E during pile driving operations.

For this, this temporary holding system 1 is advantageously intended to equip a floating device F (illustrated very partially and schematically in FIG. 1) which is suitable for laying foundation piles E by driving, or even laying wind turbines off-shore on the installed foundation piles E.

Preferably, such a floating device F comprises:
- a temporary holding system 1 according to the invention, advantageously equipping its bridge,
- a driving system B of said foundation pile E held in the temporary holding system 1, and
- preferably a means of dynamic positioning or "DP", classic in itself (computer-controlled system which allows a ship to maintain its position by using its own means of propulsion).

The driving system B (also named "pile driver system"), for example a hydraulic hammer, is intended to overcome the foundation pile E held by the temporary holding system 1 and to axially impact the free upper end of this foundation pile E to ensure its anchoring in the floor.

Such a foundation pile E, generally made of steel, is held and guided vertically by the temporary holding system 1 during its anchoring in the ground by driving in thanks to the driving operations.

This temporary holding system 1 is particularly useful for ensuring active compensation of the relative movement of the floating device F with respect to the foundation pile E during pile driving.

For this, according to the invention, the temporary holding system 1, also called "pile gripper", comprises:
- a sleeve 2 delimiting a through pipe 21 which is intended to receive a section of the foundation pile E and which defines a longitudinal axis 21' (also called the longitudinal axis of the sleeve), and
- a support frame 3 which carries said sleeve 2 and which comprises a base 31 (advantageously fixed) intended to be secured to a floating device F.

The sleeve 2 is advantageously intended to surround/enclose a section of the foundation pile E and to maintain the longitudinal axis E' of this foundation pile E according to a vertical orientation and according to a determined geolocation.

For this, the support frame 3 drives the sleeve 2 according to two translational degrees of freedom L1, L2 (advantageously in X-Y) which are perpendicular to the longitudinal axis 21' of its through conduit 21 (advantageously in Z).

The support frame 3 thus aims at maintaining a determined geolocation of the sleeve 2, throughout the pile driving operations.

To this end, as illustrated in more detail in FIGS. 1 to 4, the support frame 3 comprises:
- slide means 32, defining the two translational degrees of freedom L1, L2 between the sleeve 2 and the base 31, and
- actuating means 33 (FIG. 4), intended to generate movements of the sleeve 2 with respect to the base 31, according to the two translational degrees of freedom L1, L2.

Slide Means

The slide means 32 are arranged to define the two translational degrees of freedom L1, L2.

The two translational degrees of freedom L1, L2 extend respectively in two superimposed parallel planes P1, P2, advantageously parallel to the plane defined by the deck of the floating device F.

The two translational degrees of freedom L1, L2 also are:
- perpendicular to each other, and
- perpendicular to the longitudinal axis 21' of said sleeve 2 (advantageously intended to extend vertically).

For this, the slide means 32 comprise two superimposed slide modules 32a, 32b which each define one of the two aforementioned translational degrees of freedom L1, L2.

Figure 4:
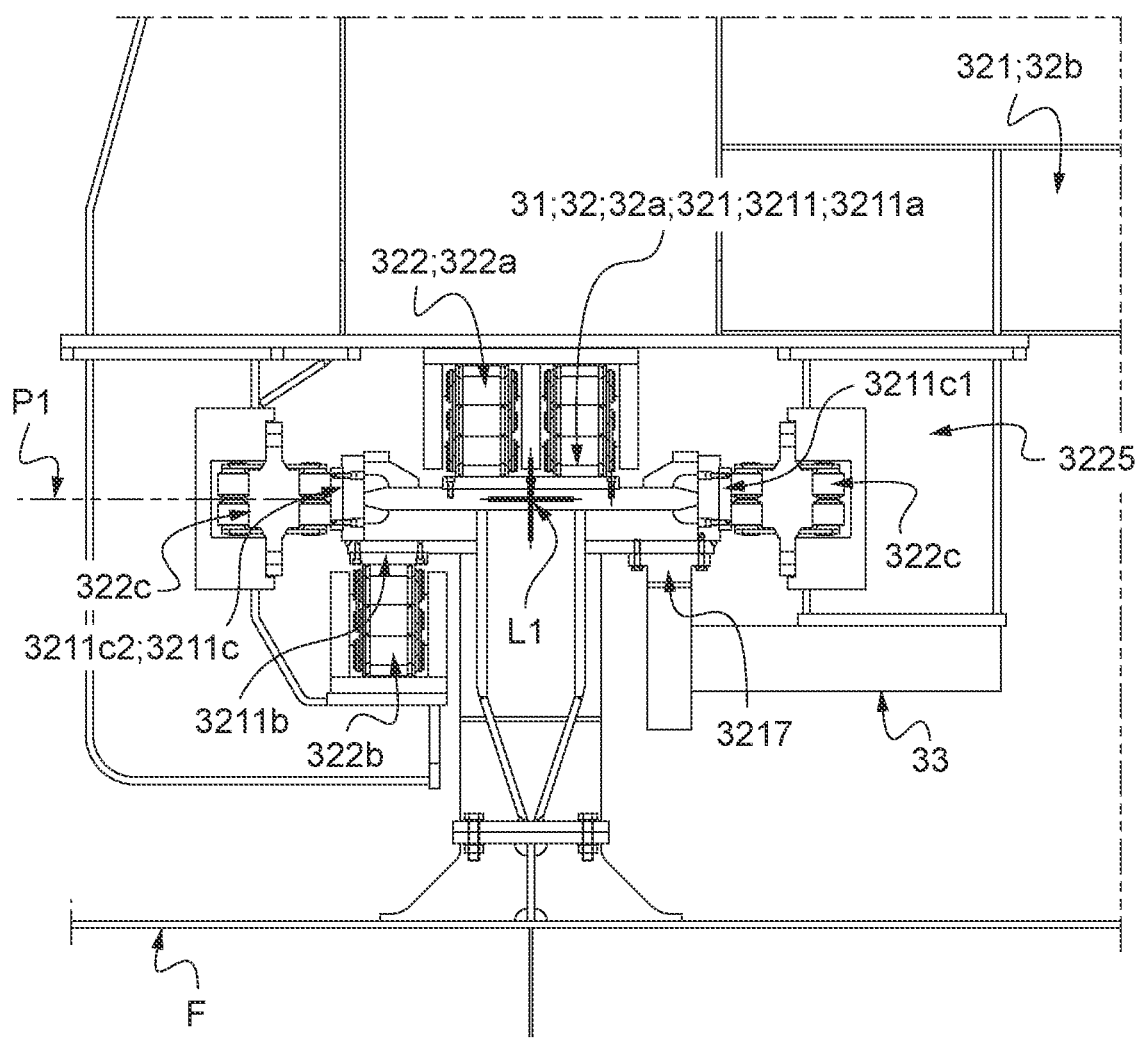
FIG. 4 is another partial and enlarged view of the temporary holding system according to FIG. 1, also illustrating the structure of the slide means.

According to the invention, as illustrated in particular in FIG. 4, each one of the slide modules 32a, 32b comprises:
- at least one rail 321, preferably at least two rails 321, comprising at least one raceway 3211 which is oriented parallel to the associated translational degree of freedom L1, L2, and
- at least one rolling element 322 intended to circulate along said at least one raceway 3211.

According to a preferred embodiment, the slide modules 32a, 32b are advantageously superimposed, with:
- a lower first slide module 32a, advantageously defining a lateral left/right translational degree of freedom L1, advantageously corresponding to a stern/bow direction of the floating device F,
- an upper second slide module 32b, advantageously defining a forward/backward translational degree of freedom L2, advantageously corresponding to a port/starboard direction of the floating device F.

Figure 3:
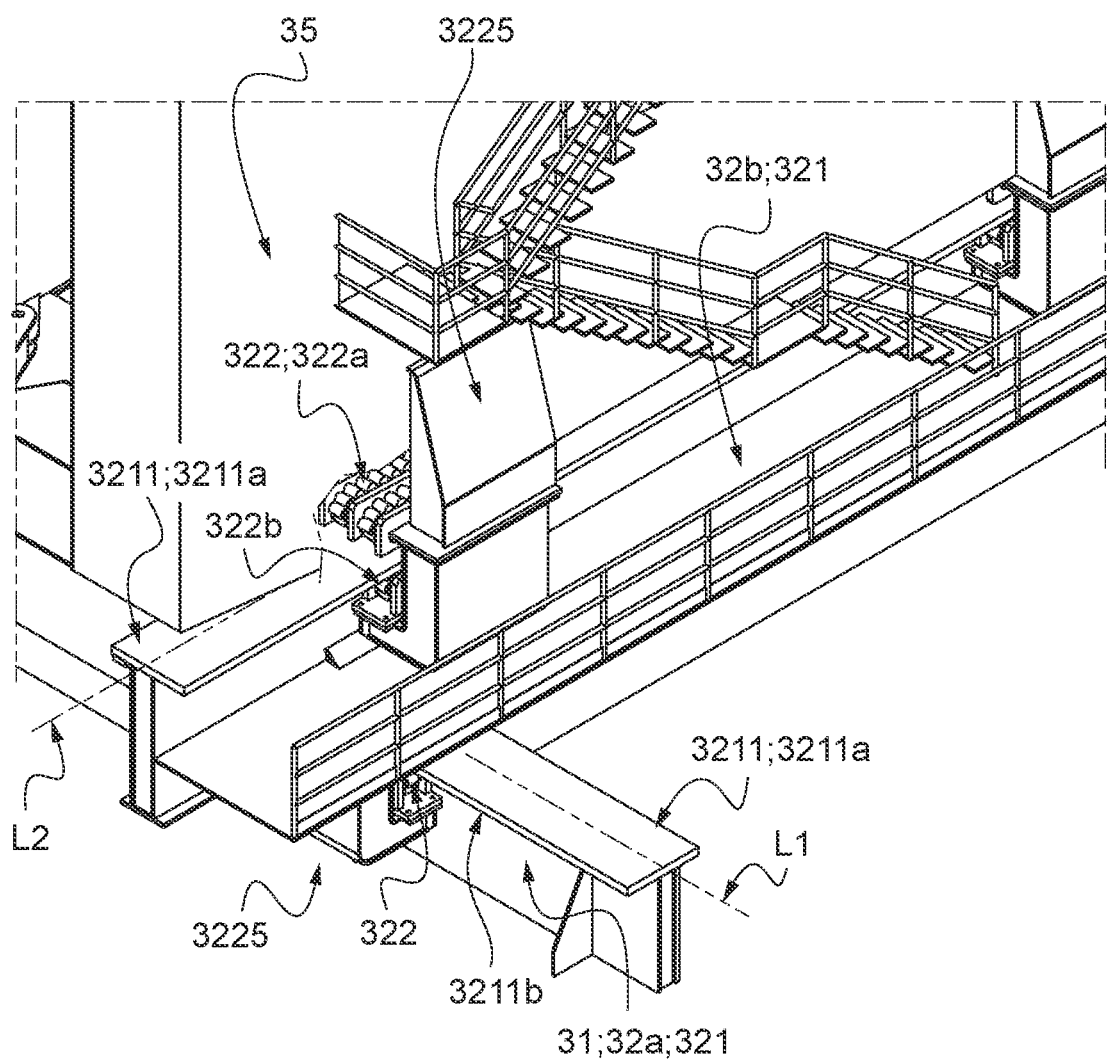
FIG. 3 is a partial and enlarged view of the temporary holding system according to FIG. 1, showing the structure of its slide means.

As illustrated in particular in FIGS. 3 and 4, the lower first slide module 32a comprises:
- at least one rail 321 forming a base 31, advantageously underlying, and
- at least one rolling element 322 which is secured to at least one rail 321, advantageously overlying, constituting the upper second slide module 32b.

In other words, said at least one rail 321 of the second slide module 32b is here equipped with said at least one rolling element 322 cooperating with said at least one rail 321 of the first slide module 32a.

As illustrated in particular in FIG. 3, the upper second slide module 32b comprises:
- at least one rail 321, advantageously underlying, carrying said at least one rolling element 322 of the first slide module 32a, and
- at least one rolling element 322 equipping an interface 35 of the support frame 3, advantageously overlying, which carries the sleeve 2 in a cantilevered way.

In other words, the interface 35 is here equipped with said at least one rolling element 322 of the second slide module 32b.

Said at least one rail 321 of the lower first slide module 32a is advantageously perpendicular to said at least one rail 321 of the upper second slide module 32b.

Figure 5:
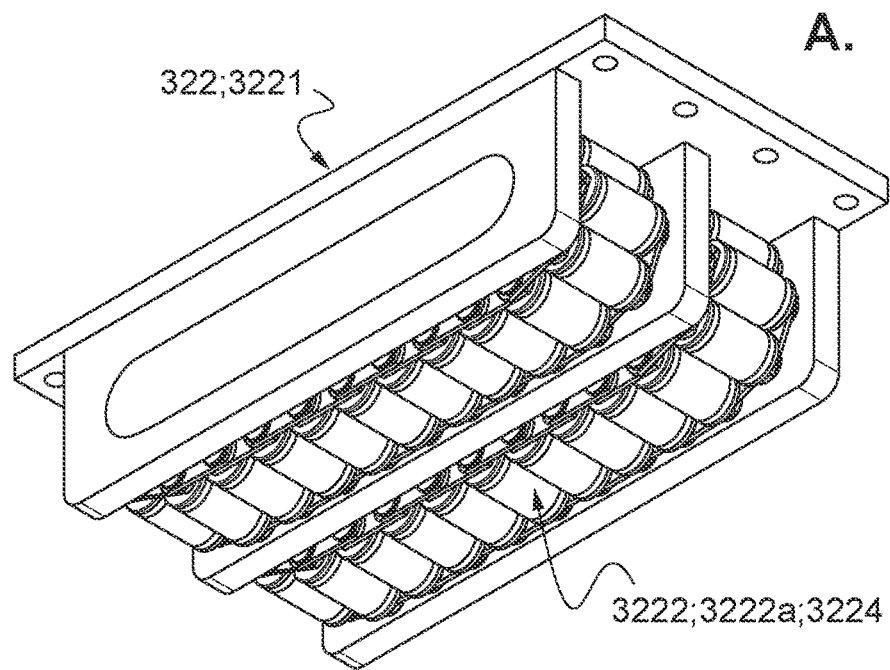
FIG. 5 is an isolated view, in perspective (A) and in section (B), of a rolling element fitted to the slide means.
Figure 5:
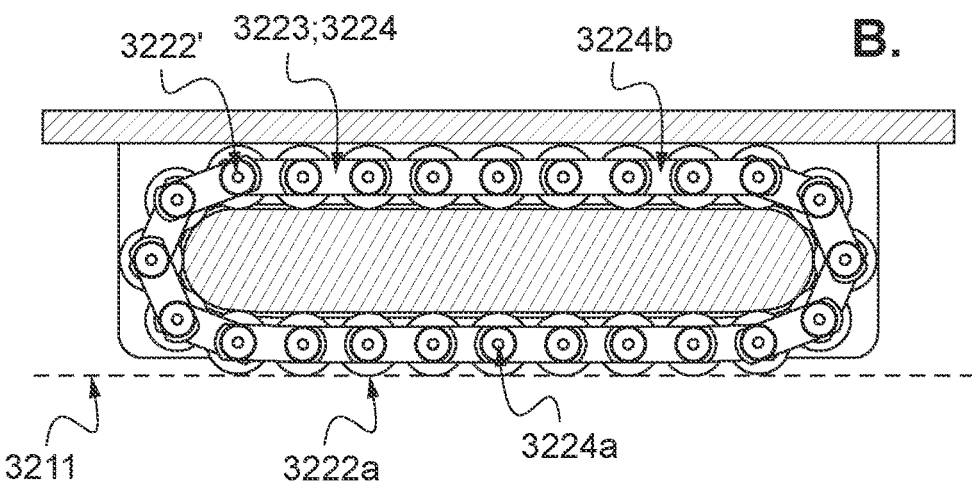

Still according to the invention, said at least one rolling element 322 consists of a cylindrical roller 322 (see in particular FIG. 5).

This cylindrical roller 322 comprises several cylindrical rollers 3222.

Each cylindrical roller 3222 advantageously comprises a cylindrical running surface 3222a which is intended to roll on a raceway 3211 and which defines a longitudinal axis 3222' which is parallel to this same raceway 3211 (FIG. 5).

Each cylindrical roller 3222 is able to pivot freely about its longitudinal axis 3222' when rolling along the raceway 3211.

According to a preferred embodiment illustrated in FIG. 5, a cylindrical roller 322 comprises a support block 3221 equipped with cylindrical rollers 3222 which are connected by links 3223 to form at least one chain of cylindrical rollers 3224.

The longitudinal axes 3222' of the cylindrical rollers 3222 equipping a rolling element 322 advantageously extend parallel to each other.

Preferably, such a chain of cylindrical rollers 3224 forms a chain of cylindrical rollers 3224 recirculating within the support block 3221.

The chain of recirculating cylindrical rollers 3224 thus comprises:
- a frontal or front active strand 3224a, advantageously straight, cooperating with a raceway 3211, and
- a back or rear inactive strand 3224b.

A cylindrical roller 322 advantageously comprises at least two chains of cylindrical rollers 3224 (or even only two chains of cylindrical rollers 3224) which are juxtaposed laterally, preferably within the same support block 3221.

Said at least two chains of cylindrical rollers 3224 cooperate with the same raceway 3211.

In general, said at least one rail 321 advantageously comprises at least two raceways 3211 (FIG. 4), namely from among:
- at least one upper raceway 3211a (preferably parallel, and opposite, to the deck of the floating device F), advantageously horizontal, cooperating with an overlying cylindrical roller 322a,
- at least one lower raceway 3211b (preferably parallel, and opposite, to the deck of the floating device F), advantageously horizontal, cooperating with an underlying cylindrical roller 322b, and optionally
- at least one lateral raceway 3211c (preferably perpendicular to the deck of the floating device F), advantageously vertical, cooperating with a lateral cylindrical roller 322c, preferably an inner lateral raceway 3211c1 (facing a second rail 321) and/or an outer side raceway 3211c2 (opposite a second rail 321).

Such a rail 321 advantageously has a T-section, the horizontal upper branch of which forms the various raceways 3211, preferably with:
- the upper surface of the upper branch forms said at least one upper raceway 3211a,
- the lower surface of the upper branch forms said at least one lower raceway 3211b and
- at least one of the edges of the upper branch forms said at least one lateral raceway 3211c.

The different cylindrical rollers 322, cooperating with the different raceways 3211, are advantageously carried by a carriage 3225, advantageously in the general shape of a C opening towards the deck of the floating device F (FIG. 4).

Such a combination of raceways 3211 is useful for conferring optimum guidance according to each translational degree of freedom L1, L2, in particular taking into account the relative forces exerted between the sleeve 2 and the foundation pile E.

Still generally, a raceway 3211 advantageously has a flat surface which is parallel to the longitudinal axis 3222' of the associated cylindrical rollers 3222.

Actuating Means Associated with the Slide Means

The actuating means 33, associated with the slide means 32, advantageously consist of electric motors.

Electric motors 33 advantageously cooperate with racks 3217 carried by said at least one rail 321 (FIG. 4).

Such electric motors 33 are preferably associated with electrical energy storage means (not shown) which are provided to store the electrical energy and to restore the electrical energy in an actuating phase.

In particular, the electrical energy storage means are provided for storing the electrical energy generated by:
- the electrical power source of the equipped floating device F and/or
- these electric motors 33 in a braking phase (restitution).

The electrical energy storage means are advantageously chosen from at least one capacitor, one supercapacitor, one battery or one motor/generator with flywheel.

The electrical energy storage means may comprise several capacitors, supercapacitors, batteries or motors/generators with a flywheel, connected in series, connected in parallel, or any combination thereof.

Sleeve

As mentioned previously, the sleeve 2 is advantageously intended to surround/enclose a section of the foundation pile E and to maintain the longitudinal axis E' of this foundation pile E in a vertical orientation.

Figure 7:
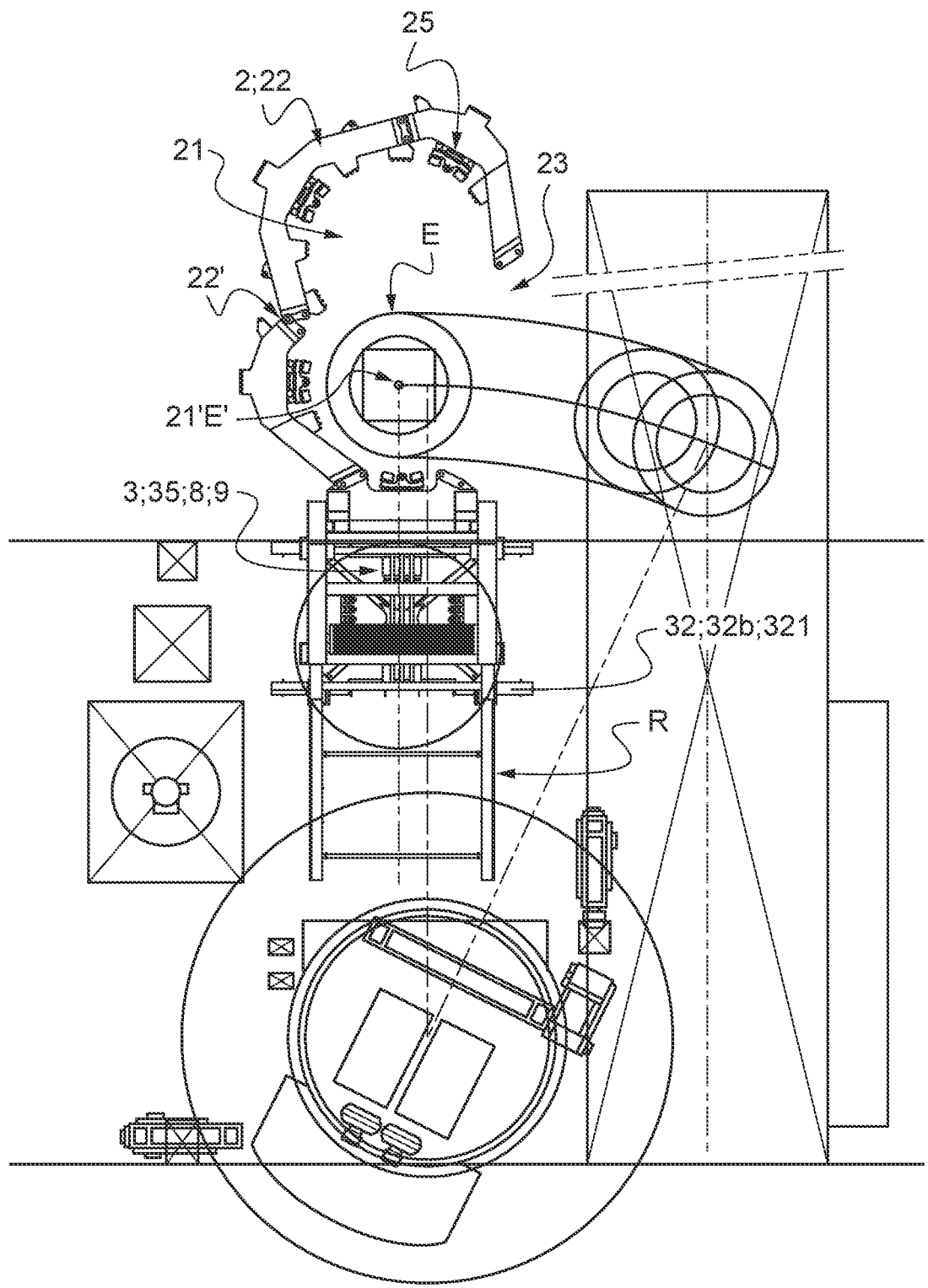
FIG. 7 is a general view from above of the temporary holding system according to FIG. 1, in which the sleeve is in the open configuration to define a radial passage allowing entry/exit of the foundation pile.

The sleeve 2, intended to receive a section of the foundation pile E, advantageously comprises at least two portions 22 which are rotatable with respect to each other, around an axis of rotation 22' parallel to the longitudinal axis 21' of sleeve 2 (FIG. 7).

These mobile portions 22 thus define two configurations:
- an open configuration (FIG. 7), defining a radial passage 23 allowing entry and/or exit of a foundation pile E (towards the through conduit 21 or out of the through conduit 21), for example by means of an actuating crane, and
- a closed configuration (FIG. 2), delimiting the through conduit 21.

In the closed configuration, the through conduit 21 is closed around its circumference; it opens above and below said through conduit 21.

Still generally, the sleeve 2 advantageously comprises support segments 25, intended to bear on the section of the foundation pile E.

Figure 8:
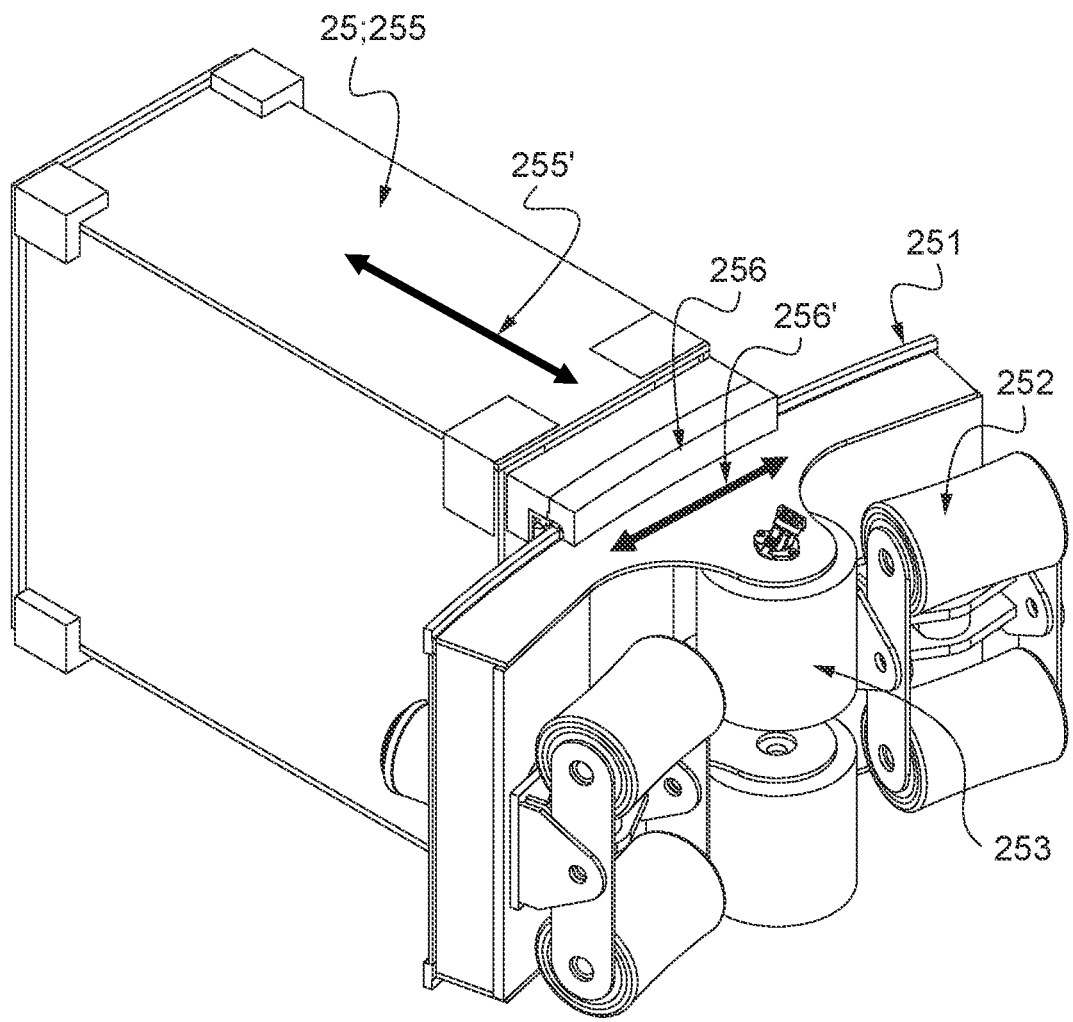
FIG. 8 is an isolated and enlarged view of a support segment equipping the sleeve, intended to bear against a section of a foundation pile.

One of these support segments 25 is illustrated in detail in FIG. 8.

The bearing segments 25, for example three or four in number, are distributed over the circumference of the longitudinal axis 21' of the through conduit 21 and each comprise a bearing head 251.

To cooperate with the section of the foundation pile E, the bearing head 251 advantageously comprises a combination of rollers 252, 253, namely:
- first rollers 252 oriented perpendicular to the longitudinal axis 21' of the sleeve 21, advantageously free in rotation, to maintain contact during a relative translational movement of the foundation pile E with respect to the sleeve 2, and possibly second rollers 253 oriented parallel to the longitudinal axis 21' of the sleeve 2, advantageously motorized, to control a relative rotational displacement between the foundation pile E and the sleeve 2.

The first rollers 252 are in particular intended to travel along the length of the foundation pile E during pile driving operations and also to compensate for the vertical movements of the floating device F.

The second rollers 253 are useful for actuating the foundation pile E around its longitudinal axis before laying it on the ground.

Preferably, the first rollers 252 and/or the second rollers 253 cooperate with actuating means (not shown) between a retracted position and a deployed position.

These actuating means, for example an electric motor, are useful for positioning, alternately, the first rollers 252 and the second rollers 253 in contact with the foundation pile E.

Still preferably, a support segment 25 comprises complementary actuating means, namely:

translation actuating means 255 for actuating its bearing head 251 in translation, along a radial translation axis 255' with respect to the longitudinal axis 21' of the sleeve 2, and/or rotation actuating means 256 for actuating in rotation of its support head 251, along a circular arc trajectory 256' whose center corresponds to the longitudinal axis 21' of the sleeve 2.

The translation actuating means 255 consist, for example, of electric cylinders or hydraulic cylinders. They are useful for adjusting the bearing head 251 as a function of the diameter of the foundation pile E and for taking into account any variations in diameter of the latter during pile driving operations.

The rotational actuating means 256 consist for example of a slide system associated with a pinion/crown couple. They are useful for following the yaw movement of the floating device F around the longitudinal axis E' of the foundation pile E during pile driving while maintaining the contact of the first rollers 252 with this foundation pile E.

Actuating Means in Height of the Sleeve

Figure 6:
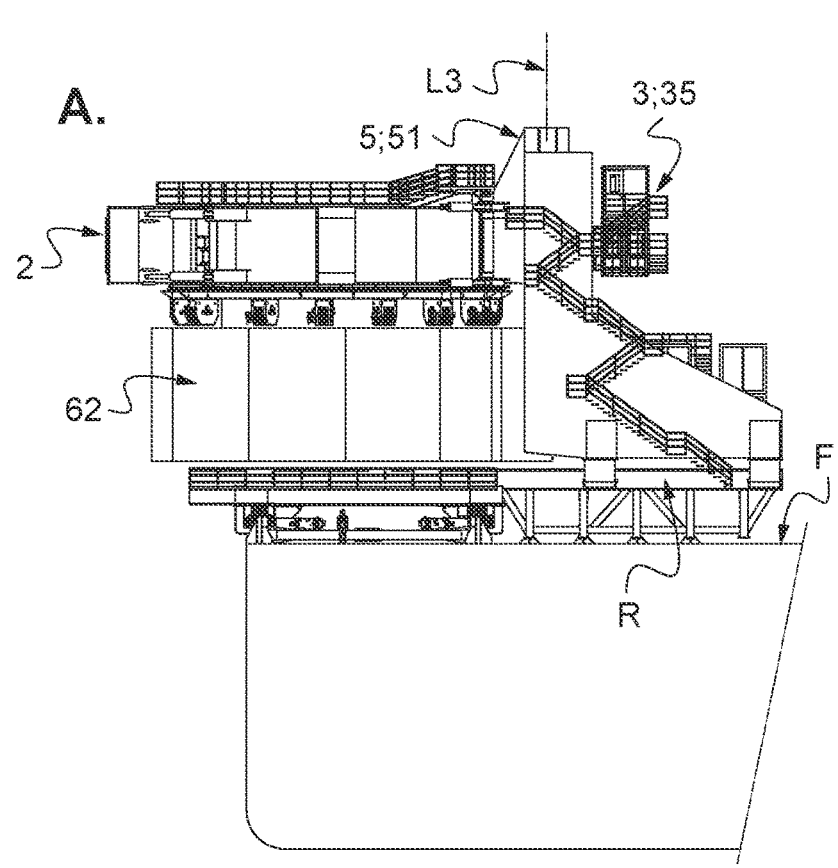
FIG. 6 is a general side view which shows the sleeve in a retracted and raised position (A) and then in a deployed and lowered position (B)
Figure 6:
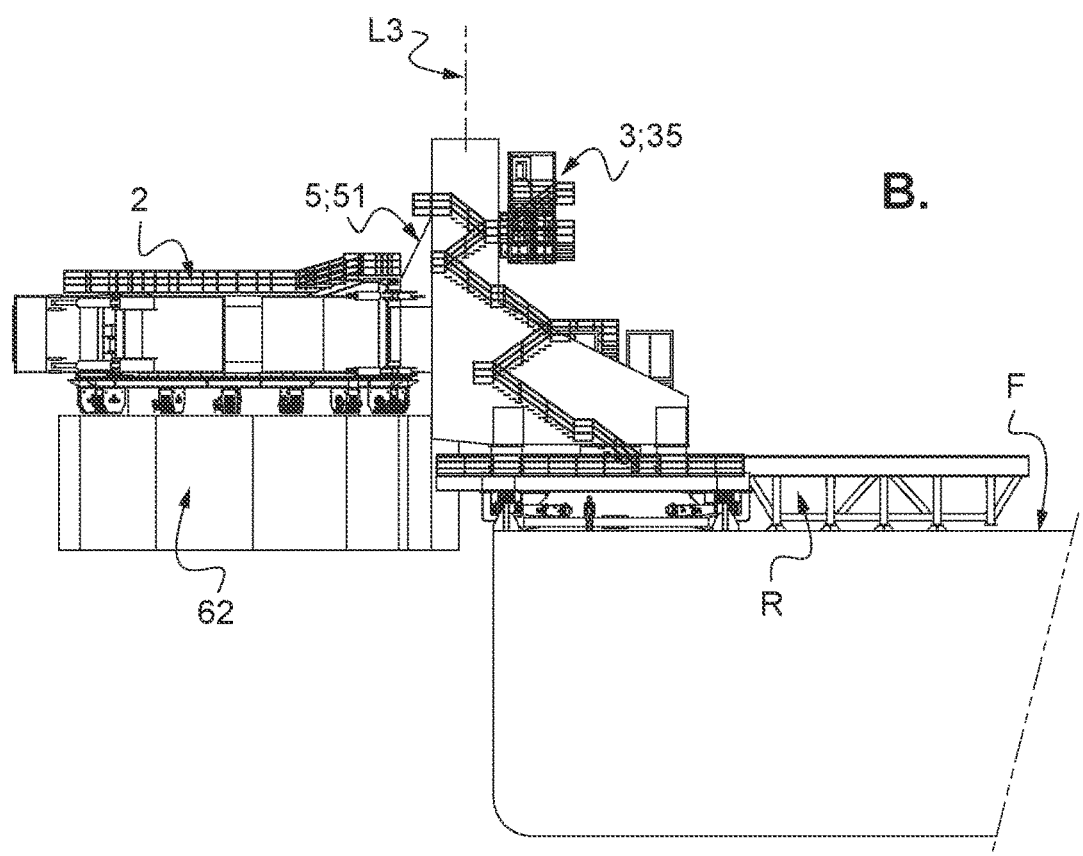

Still in general, the temporary holding system 1 advantageously comprises height actuating means 5 in height of the sleeve 2 relative to the base 31 (FIGS. 1 and 6).

This actuating in height thus defines a translational degree of freedom L3 which is parallel to the longitudinal axis 21' of the sleeve 2.

In this case, the height actuating means 5 consist of a carriage 51, motorized, equipping the support frame 3 (and in particular its interface 35).

These height actuating means 5 in height are particularly useful for actuating the sleeve 2 between two positions:

a raised position (FIG. 6, A), useful for retracting the sleeve 2 above the deck of the floating device F, and a lowered position (FIG. 6, B), useful for deploying the sleeve 2 in a cantilevered way from the deck of the floating device F and to reduce the distance from sea level.

To obtain an optimal retracted position, the temporary holding system 1 advantageously also comprises at least one storage rail R which is installed parallel to said at least one rail 321 of the second slide module 32b.

Said at least one storage rail R is adapted to come in the extension of said at least one rail 321 of the second slide module 32b, in view of transferring the sleeve 2 (with its interface 35) from the second slide module 32b to said at least one storage rail R.

Pile Driving Noise Reduction Means

The sleeve 2 is advantageously also equipped with means for reducing the pile driving noise 6 (FIGS. 1 and 9), preferably conventional in itself.

Figure 9:
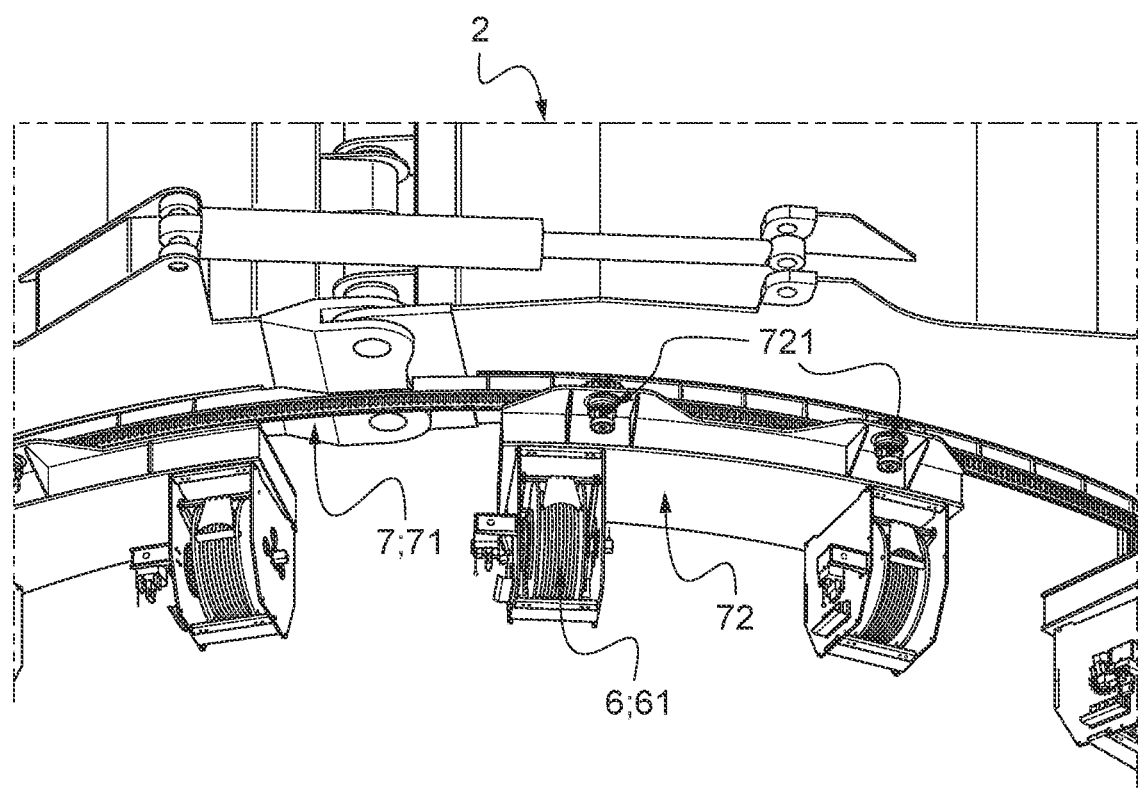
FIG. 9 is a partial and enlarged view of the means for actuating in relative rotation between the sleeve and the means for reducing the pile driving noise.

The pile driving noise reduction means 6 consist for example of an underwater sound barrier in the form of a curtain of bubbles, whose deployment winches 61 are illustrated in FIG. 9.

These deployment winches 61 are advantageously housed in a basket 62 which is underlying the sleeve 2.

The sleeve 2 and the pile driving noise reduction means 6 cooperate in relative rotation through actuating means 7 (FIG. 9).

These actuating means 7 in relative rotation allow the angular position of the pile driving noise reduction means 6 to be maintained with respect to the foundation pile E, during relative rotational movements between the sleeve 2 and this foundation pile E.

The actuating means 7 in relative rotation consist, for example, of a pair of rails 71 and motorized carriages 72.

The rails 71 advantageously consist of a crown which is carried under the sleeve 2 and which is concentric with the longitudinal axis 21' of the sleeve 2.

The motorized carriages 72 slide along the rails 71 and include electric motors 721 cooperating with its rails 71; these motorized carriages 72 thus circulate along a circular trajectory which is concentric with the longitudinal axis 21' of the sleeve 2.

Relative Position Collection Means and Piloting Means

The temporary holding system 1 also advantageously comprises means 8 for collecting the relative position, advantageously in real time, between the sleeve 2 and the floating device F (FIG. 1).

These means 8 for collecting the relative position comprise in particular:

a module for collecting the geolocation, respectively, of the sleeve 2 and of the floating device F, advantageously in a geolocation repository, and a processing module, to determine the relative position between the sleeve 2 and the floating device F.

The temporary holding system 1 further comprises control means 9, associated with the actuating means 33 equipping the slide means 32, which are suitable for controlling said actuating means 33 taking into account said relative position resulting from the collection means 8 (between said sleeve 2 and said floating device F).

The control means 9 thus advantageously constitute a computer-controlled system which makes it possible to maintain, continuously, the position of the sleeve 2 (compensating for the movements caused by the waves), by using the actuating means 33 so as to keep a position of the longitudinal axis 21' of the through conduit 21 at a target/setpoint geolocation point.

The control means 9 thus ensure continuous actuating of the sleeve 2 according to the two aforementioned translational degrees of freedom L1, L2 (axes in X and Y), so as to ensure active compensation of the movements of the floating device F and so as to maintain a precise geolocation, even a verticality, of this sleeve 2 during the pile driving operations.

These control means 9 stabilize, actively and continuously, the position of the sleeve 2 on a vertical axis (Z axis), by controlling this sleeve 2 according to the two aforementioned translational degrees of freedom L1, L2 (axes in X and Y), preferably throughout the pile driving operations.

Of course, various other modifications may be made to the invention within the scope of the appended claims.

The invention claimed is:

1. A system for temporarily holding, during pile driving operations, a foundation pile intended to receive the mast of an off-shore wind turbine, the temporary holding system comprising:
   a sleeve delimiting a through conduit, intended to receive a section of said foundation pile and defining a longitudinal axis; and
   a support frame, which carries said sleeve and which comprises a base configured to be secured to a floating device, the support frame comprising:
      a slide system, defining two translational degrees of freedom between said sleeve and said base, said translational degrees of freedom extending in two parallel planes, being perpendicular to each other and being perpendicular to said longitudinal axis of said sleeve, and
      an actuator configured, to generate displacements of said sleeve relative to said base according to said two translational degrees of freedom, the actuator consisting of electric motors associated with an electric energy storage to store the electric energy generated by one or more of an electric power source of the floating craft and the electric motors in a braking phase, and to restore the electrical energy in an actuating phase,
   wherein the slide system comprises two superimposed slide modules which each define one of said translational degrees of freedom, the slide modules each comprising:
      at least one rail comprising at least one raceway which is oriented parallel to said associated translational degree of freedom, and
      at least one rolling element configured to circulate along said at least one raceway, the at least one rolling element consisting of a cylindrical roller.

2. The temporary holding system according to claim 1, wherein said cylindrical roller comprises a support block equipped with cylindrical rollers which are connected by links to form at least one chain of cylindrical rollers.

3. The temporary holding system according to claim 2, wherein said chain of cylindrical rollers forms a chain of cylindrical rollers recirculating within said support block, the chain of recirculating cylindrical rollers comprising:
   an active strand, cooperating with a raceway, and
   a returning inactive strand.

4. The temporary holding system according to claim 1, wherein the at least one rail comprises at least two raceways including:
   at least one upper raceway cooperating with an overlying cylindrical roller, and
   at least one lower raceway cooperating with an underlying cylindrical roller.

5. The temporary holding system of claim 4, further comprising at least one lateral raceway, cooperating with a lateral cylindrical roller.

6. The temporary holding system according to claim 1, wherein the two superimposed slide modules include:
   a lower first slide module comprising:
      at least one rail forming a base, and
      at least one rolling element, and
   an upper second slide module comprising:
      at least one rail secured to said at least one rolling element of the first slide module, and
      at least one rolling element equipping an interface carrying said cantilevered sleeve.

7. The temporary holding system of claim 6, wherein the lower first slide module defines a lateral left/right translational degree of freedom, and the upper second slide module defines a forward/backward translational degree of freedom.

8. The temporary holding system according to claim 1, wherein the sleeve comprises at least two portions which are rotatable with respect to each other, around an axis of rotation parallel to the longitudinal axis of the through conduit, to define two configurations including:
   an open configuration defining a radial passage allowing the passage of a foundation pile, and
   a closed configuration delimiting the through conduit.

9. The temporary holding system according to claim 1, wherein the sleeve comprises support segments configured to bear on the section of foundation pile, the support segments being distributed over the circumference of said longitudinal axis, each of the support segments comprising a support head.

10. The temporary holding system according to claim 9, wherein said support head comprises:
    first rollers oriented perpendicularly to the longitudinal axis of the through conduit to maintain contact during relative translational displacement of the foundation pile relative to the sleeve.

11. The temporary holding system of claim 10, wherein the first rollers are free in rotation, and
    the temporary holding system further comprises motorized second rollers oriented parallel to the longitudinal axis of the through conduit to control a relative rotational movement between the foundation pile and the sleeve.

12. The temporary holding system according to claim 9, wherein at least one of the support segments comprises one or more of:
    a translation actuator configured to translate its support head along a radial translation axis relative to the longitudinal axis of the through conduit,
    a rotation actuator configured to rotate its support head along an arcuate trajectory whose center corresponds to the longitudinal axis of the through conduit.

13. The temporary holding system according to claim 1, wherein the sleeve is equipped with pile driving noise reduction system, the sleeve and the pile driving noise reduction system cooperating by the actuator in relative rotation.

14. The temporary holding system of claim 13, where the pile driving noise reduction system comprises an underwater sound barrier in the form of a curtain of bubbles.

15. The temporary holding system according to claim 1, further comprising a collector configured to collect the relative position between said sleeve and said floating device, and wherein said actuator is associated with a piloting system configured to pilot said actuator taking into account said relative position between said sleeve and said floating device in order to control said sleeve according to said two translational degrees of freedom.

16. The temporary holding system of claim 15, wherein the piloting system is configured to control the sleeve vertically and to maintain geolocation.

17. A floating device, comprising:
    the temporary holding system according to claim 1, and
    a system for driving said foundation pile held in said temporary holding system.

* * * * *